(12) United States Patent
Gritter et al.

(10) Patent No.: US 8,693,227 B2
(45) Date of Patent: Apr. 8, 2014

(54) INVERTER CONTROL WHEN FEEDING HIGH IMPEDANCE LOADS

(75) Inventors: David J. Gritter, Wauwatosa, WI (US); James Ulrich, Hartland, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 252 days.

(21) Appl. No.: 13/235,686

(22) Filed: Sep. 19, 2011

(65) Prior Publication Data
US 2013/0070505 A1    Mar. 21, 2013

(51) Int. Cl.
*H02M 1/08*    (2006.01)

(52) U.S. Cl.
USPC .......................................................... 363/95

(58) Field of Classification Search
USPC ................................. 363/95–99, 65
See application file for complete search history.

(56) References Cited

U.S. PATENT DOCUMENTS

| | | | |
|---|---|---|---|
| 4,958,117 A | 9/1990 | Kerkman et al. | |
| 5,083,039 A | 1/1992 | Richardson et al. | |
| 5,099,186 A | 3/1992 | Rippel et al. | |
| 5,140,248 A | 8/1992 | Rowan et al. | |
| 5,172,310 A | 12/1992 | Deam et al. | |
| 5,929,538 A | 7/1999 | O'Sullivan et al. | |
| 6,137,187 A | 10/2000 | Mikhail et al. | |
| 6,420,795 B1 | 7/2002 | Mikhail et al. | |
| 7,072,195 B2 | 7/2006 | Xu | |
| 7,135,833 B2 | 11/2006 | DeLange et al. | |
| 7,333,352 B2 | 2/2008 | Petter et al. | |
| 7,492,617 B2 | 2/2009 | Petter et al. | |
| 7,535,120 B2 | 5/2009 | Erdman et al. | |
| 2002/0036430 A1 | 3/2002 | Welches et al. | |
| 2002/0149953 A1 | 10/2002 | Smedley et al. | |
| 2005/0122083 A1 | 6/2005 | Erdman et al. | |
| 2005/0180175 A1 | 8/2005 | Torrey et al. | |
| 2007/0189045 A1 | 8/2007 | Gritter | |
| 2008/0007121 A1 | 1/2008 | Erdman et al. | |
| 2008/0298103 A1 | 12/2008 | Bendre et al. | |
| 2009/0140577 A1 | 6/2009 | Fishman | |
| 2009/0230900 A1* | 9/2009 | Bae et al. ............... | 318/400.02 |

FOREIGN PATENT DOCUMENTS

JP    55-147983 A    11/1980

OTHER PUBLICATIONS

Papavasiliou, A., et al. "Current Control of a Voltage Source Inverter connected to the Grid via LCL Filter." *IEEE 38th Annual Power Electronics Specialists Conference* [online]. Jun. 17-21, 2007, Orlando, Florida. Retrieved Apr. 22, 2013 from the internet URL: <perso.uclouvain.be/anthony.papavasiliou/public_html/LCL.pdf>, 6 pages.
International Application No. PCT/US2012/056127, International Search Report and Written Opinion mailed on Sep. 19, 2012, 8 pages.

\* cited by examiner

*Primary Examiner* — Harry Behm
*Assistant Examiner* — Matthew Grubb
(74) *Attorney, Agent, or Firm* — Kilpatrick Townsend & Stockton LLP (57) ABSTRACT

An inverter controller comprising a current regulator unit, a voltage regulator unit coupled to the current regulator unit, an inverter unit coupled to the voltage regulator unit, and a drive unit controlled by the inverter unit.

20 Claims, 6 Drawing Sheets

INVERTER CONTROL WHEN FEEDING HIGH IMPEDANCE LOADS

BACKGROUND OF THE INVENTION(S)

The present invention(s) relates to configurations for controlling inverters used to feed power to loads. The loads may include, inter alia, power grids and motors.

Inverters are used when delivering energy into power grids. For example, energy generated by solar cells or windmills can be transferred to a grid for distribution. The inverters convert the energy into sinusoidal currents useful for alternating current powered devices.

In other instances, inverters can be used to power, e.g., four quadrant motor drives such as may be used with permanent magnet (PM) motors.

Typically, the connection between a grid and the inverter consists of a three-phase pulse width modulated (PWM) inverter output feeding an inductor network, which smoothes the PWM voltage to produce a sinusoidal current on which is superimposed remnant PWM carrier frequency ripple current. This ripple current component can be shunted through a harmonic filter capacitor, resulting in a pure sinusoidal current which can be fed into the power grid. Inverter controls normally are used to regulate either the inverter or the grid current to control power flow and power factor.

Similar systems are used to control torque in PM motors and generators, at least where low acoustic noise is desirable.

Figure 1:
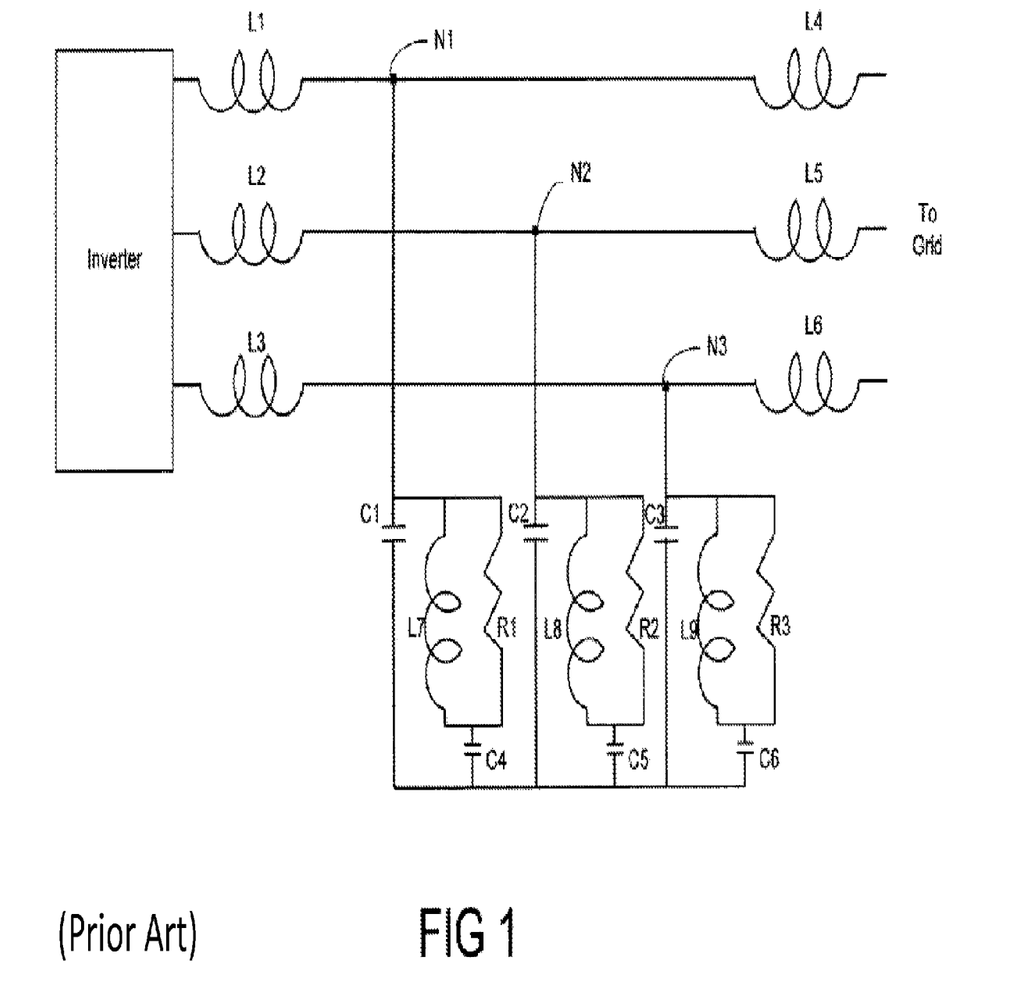
FIG. 1 depicts a conventional inverter to power grid connection.

FIG. 1 depicts a conventional inverter to power grid connection. The three phases of the power output by the inverter are respectively feed into smoothing inductors L1, L2 and L3. L4, L5 and L6 represent the inductance of the power grid.

Nodes N1, N2 and N3 represent the point of connection between the inverter smoothing inductors and the power grid.

Also respectively connected to the nodes N1, N2 N3 are harmonic filter capacitors C1, C2 and C3. The remaining inductors L7, L8 and L9; resistors R1, R2 and R3 and capacitors C4, C5 and C6 act as a damping network so that the harmonic filter does not introduce undamped second order resonance into the grid. As is known, these components can be replaced by active damping means.

Figure 2:
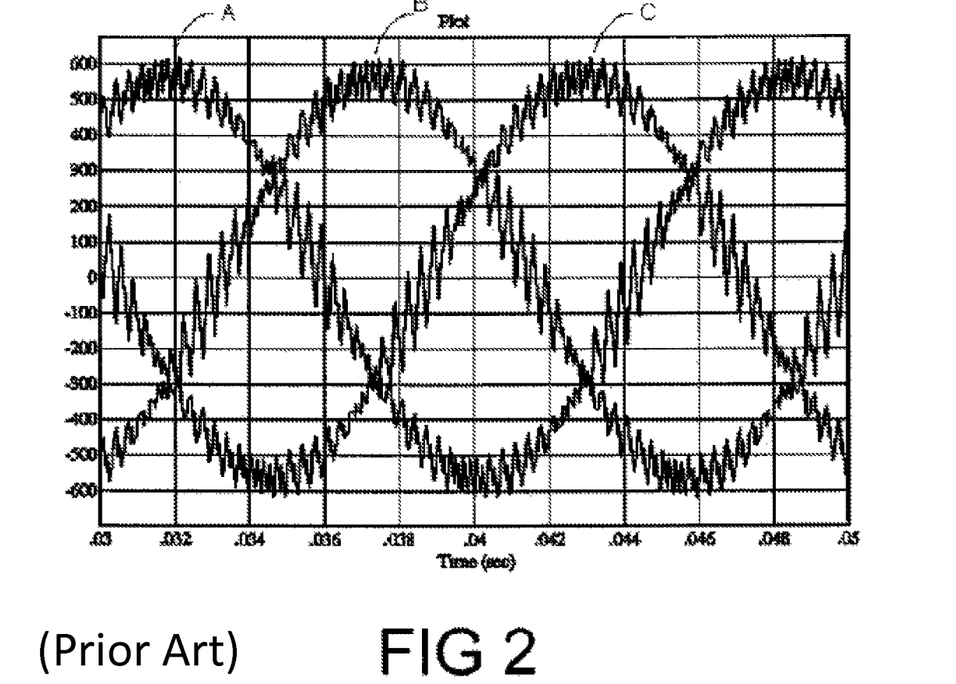
FIG. 2 depicts a current generated by an conventional inverter.
Figure 3:
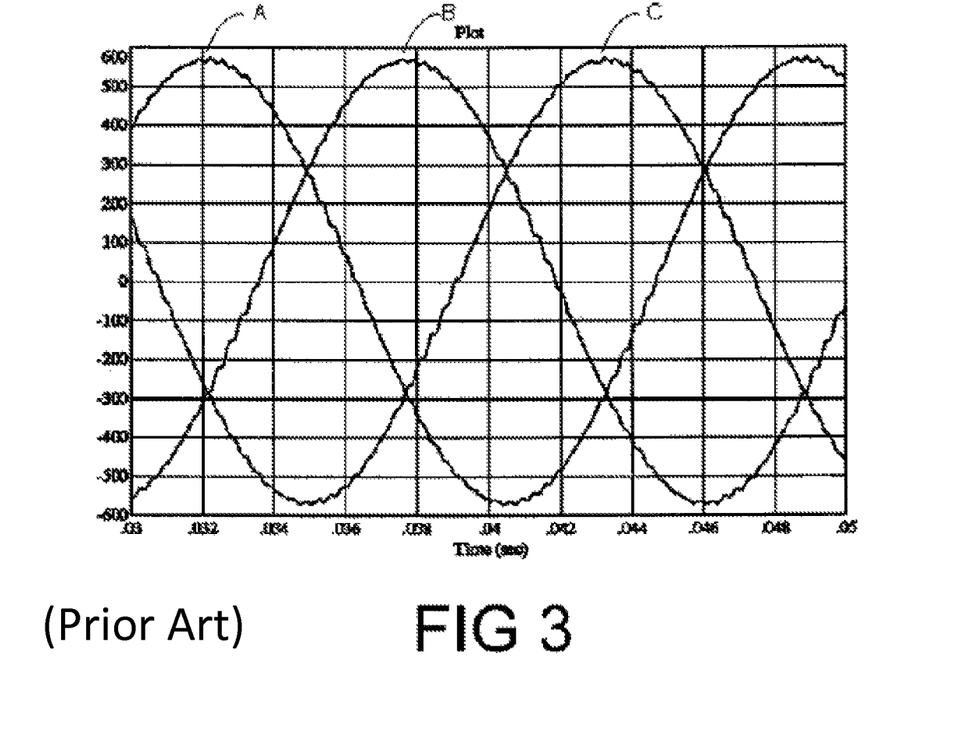
FIG. 3 depicts a typical line current in a grid using a convention inverter control configuration

FIG. 2 depicts currents A, B and C generated by a conventional inverter. FIG. 3 depicts typical line current A, B and C available in a power grid using a conventional inverter control configuration.

Figure 4:
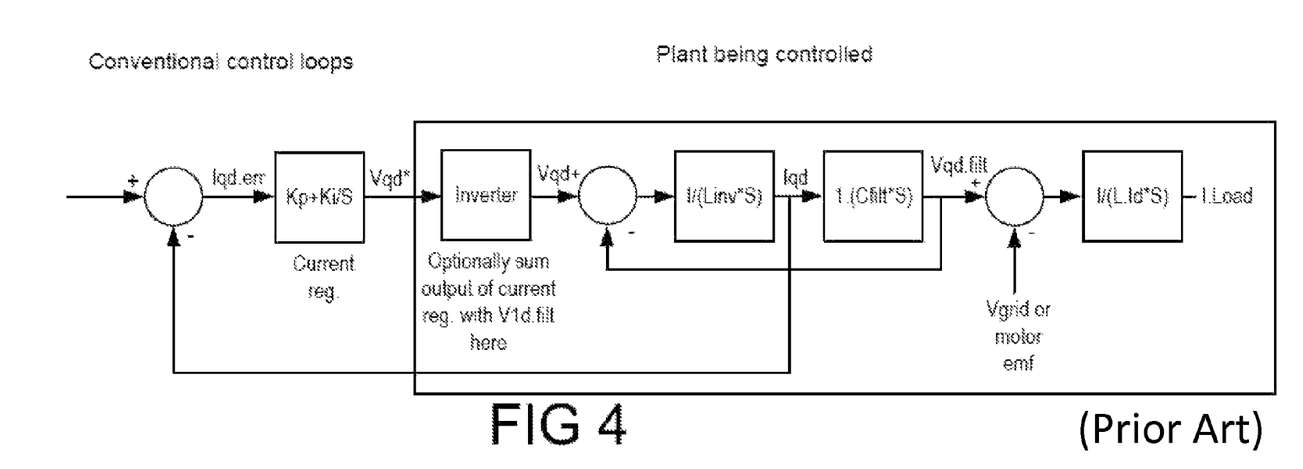
FIG. 4 is a schematic illustration of a traditional control loop used in controlling an inverter.

Traditionally, such inverters are controlled by employing a synchronous reference frame current regulator as the innermost control loop as shown in FIG. 4. In FIG. 4 there is illustrated a conventional inverter control schematic, with control loops shown.

In such a configuration, using well-known direct-quadrature-zero (dq0) transformation analysis, the fundamental component is transformed to a DC component where the Q axis current corresponds to the real component of current and the D axis current corresponds to reactive current. In the synchronous reference frame, therefore, a proportional-integral (PI) regulator will produce zero steady state error.

Typically the outer loops of such a converter generates a real component current reference Iqr. Such outer loops might include an inverter DC bus voltage regulator, or a motor speed regulator, or an external input commanding a defined current, torque, or power. Orientation of the synchronous reference frame is obtained using a phase locked loop ("PLL") which regulates the D axis voltage to zero by establishing an orientation frequency and angle.

FIG. 4 depicts in a conventional control loop where a set point ("SP") is compared against a feedback value. As FIG. 4 demonstrates, a current set point from an appropriate regulator, e.g., a speed, voltage, power or torque regulator, is compared against feedback variable Iqd obtained from the plant being controlled. The comparison yields variable Iqd.err which is fed into a current regulator to generate output voltage signal Vqd*. Voltage signal Vqd* is then fed into the inverter which in turn generates a voltage signal Vqd.

Voltage Vqd is fed into the inverter inductors as described above to generate current signal Iqd. Signal Iqd is filtered, as mentioned above, to generate voltage Vqd.flt used to power a grid or motor. However, the grid or motor is also subject to its own load voltages or back electromagnetic force ("emf") which negatively affects the power available. As illustrated, this negative impact is subtracted from the voltage Vqd.flt and filtered again by the load inductance to finally produced the load current I.Load.

The performance of the control configuration can be measured by considering the resultant current signature. In that regard, the performance of the inner current loop control can be measured by considering the step response of the control, that is, how quickly the regulators can bring the actual inverter or grid current to follow an instantaneous change in current reference. The step response is best observed in the synchronous frame.

Figure 5:
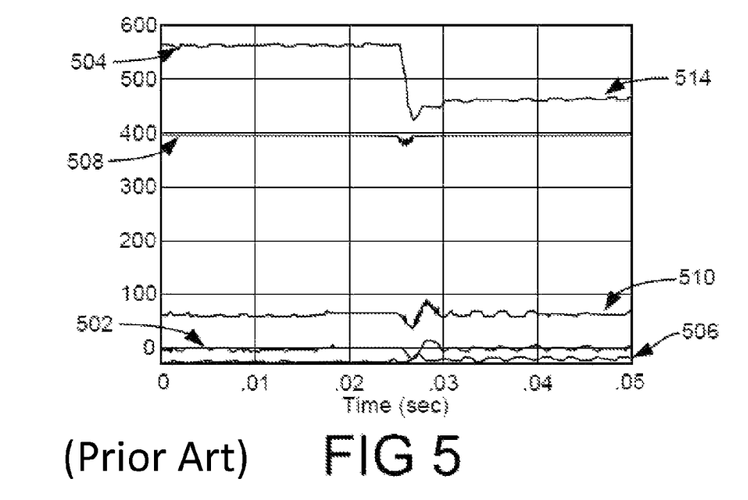
FIG. 5 is a graph representing the current and voltage responses to a step current reference change using a traditional control approach when grid or load inductance is lower than inverter inductance.

FIG. 5 is a graph representing the current and voltages fed back using a traditional control approach of FIG. 4 when the grid impedance is low. As FIG. 5 depicts, the inverter D axis current 502 is around 0, the inverter Q axis current 504 is between approximately 400 and 600 amps, the grid D axis voltage 506 is between approximately 0 as well, the grid Q axis voltage 508 is approximately 400 volts, the axis D line current 510 is between approximately 75 and 150, and the axis Q line current 514 is between approximately 400-600 amps which is substantially the same as the inverter Q axis current. As the figure depicts, a step change to the Q axis current 504 occurs at approximately 0.25 seconds which results in a well controlled, rapid step response to the new commanded value.

Figure 6:
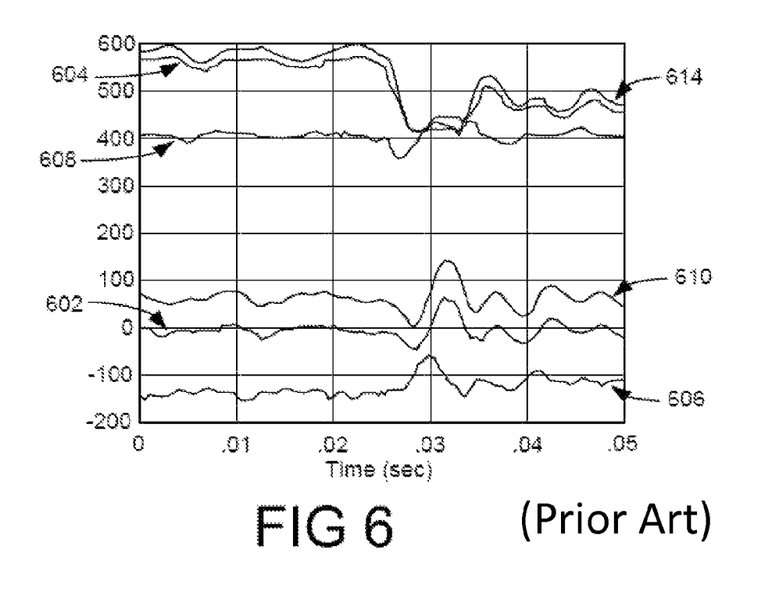
FIG. 6 is a graph representing the current and voltage responses to a step current reference change using a traditional control approach When the grid or load inductance is higher than the inverter inductance.

FIG. 6 is a graph representing the current and voltages fed back using the same control approach, with a grid or motor impedance (L4-L6 in FIG. 1) that is larger than the inverter output impedance (L1-3) in FIG. 1). As FIG. 6 depicts, the inverter D axis current 602 is around 0, the inverter Q axis current 604 is between approximately 400 and 600 amps, the grid D axis voltage 606 is between approximately −200 and −50, the grid Q axis voltage 608 is approximately 400 volts, the axis D line current 610 is between approximately 75 and 150, and the axis Q line current is between approximately 400-600 amps. As the figure depicts, a step change to the Q axis current 604 occurs at approximately 0.25 seconds which results in a controlled step response to the new commanded value.

As FIG. 6 shows, the step response is slower than it was in FIG. 5, and it is followed by a sustained oscillatory behavior. Also, in FIG. 6, a significant increase in the D axis current disturbance is shown, and there appears to be a limit cycle in the feedback even before the transient, associated with the increase in harmonic filter voltage disturbances. Additionally, it is no longer possible to use active damping to eliminate the passive damping components in the harmonic filter.

FIGS. 5 and 6 are results obtained by simulating the above described control systems using simulation software, namely VisSim™ available from Visual Solutions Inc, 487 Groton Road, Westford, Mass. 01886. In FIG. 5, the inverter inductance is 150 µH, while the line inductance is 100 µH. In FIG. 6 the line inductance is 600 µH. Accordingly, FIG. 5 depicts a situation when the inverter inductance is higher than the line inductance and FIG. 6 depicts a situation when the line inductance is larger than the inverter inductance. FIG. 6, in particular shows the sort of distorted grid currents that result from the lack of good current control when the line inductance is higher than the inverter inductance. Similar behavior can be observed in PM motor/generator applications with damped harmonic filters. Further, as FIG. 6 shows, the performance of the traditional control strategy is significantly compromised in situations when the inverter inductance is higher than the line inductance.

There are two reasons for the poor transient and steady state behavior shown in FIG. 6. The first is due to the inability of the controls to properly estimate the transformation angle used to transform currents and voltage to the synchronous DQ reference frame. This is typically accomplished with a phase locked loop (PLL)

Figure 7:
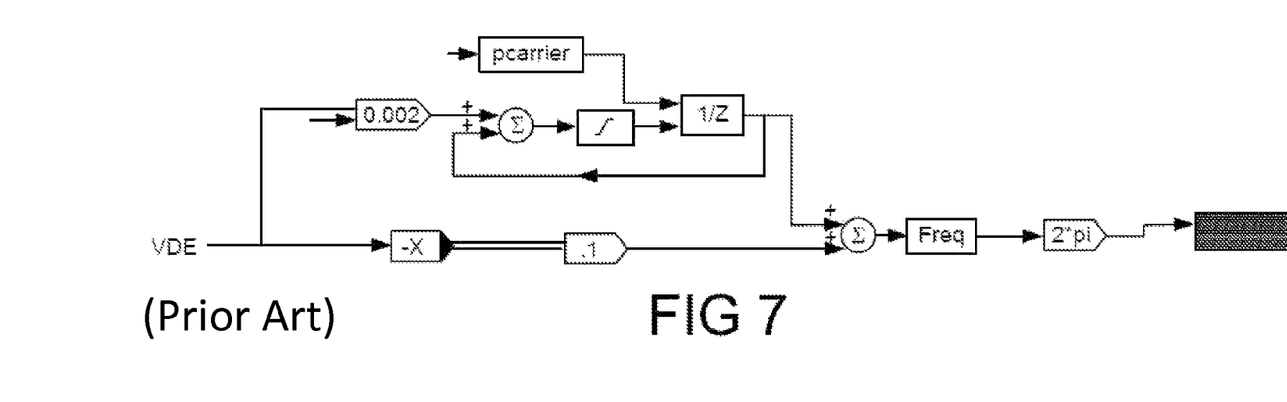
FIG. 7 is a schematic representation of a typical phase locked loop.

A typical phase locked loop is shown in FIG. 7. This PLL is utilized in PM motor drives when an encoder is not present as well as in grid connected applications. When an encoder is present in the drives the PLL is not necessary. In one embodiment that is consistent with the present invention(s), the PLL transforms a three phase voltage signal into a synchronous reference frame having a Q axis voltage component VQE, and a D axis voltage component, VDE.

In typical applications the inverter inductance (L1-L3 in FIG. 1) is larger than the grid inductance (L4-L6 in FIG. 1) of the motor/generator inductance. In this case the rapid step responses shown in FIG. 5 are possible, and it is not difficult to provide active damping to enhance the stability of the filter or to allow removal of the damping components.

Typically the line voltage for orientation is sensed at the harmonic filter capacitors, nodes N1, N2, N3 in FIG. 1, and the actual grid voltage may not even be available (e.g., in the case of PM motors). Or, the line voltage may be sensed at a point of common coupling of the equipment to the grid (in which case the inductance L4-L6 would be representative of a transformer or other grid impedances upstream of the point of common coupling).

However, as power converter technology improves, and switching frequency increases, it is possible to reduce the inverter inductance so that it becomes significantly smaller than the grid or motor/generator inductance. This happens in PM motor applications where the inverter inductance typically might be less than 5% per unit (p.u.) while the motor/generator inductance might be as high as 20% per unit. Another instance where this can happen is in connection with a wind turbine where each turbine is fed by its own transformer. Transformer impedances are typically 5% to 10% per unit, while inverter output inductance may be lower than 2% per unit when the switching frequency is raised above 8-10 kHz.

Another reason for the poor performance shown in FIG. 6 is due to is the inverter current typically being measured and fed back to the current regulator, while, when the grid inductance is significantly higher than the inverter inductance, it is the grid current, which is not directly controlled, that has the slowest dynamic response.

SUMMARY OF THE INVENTION(S)

Disclosed herein are one or more inventions embodiments of which are described herein. Principles of the present invention(s) provide for a control configuration for an inverter in which improves performance despite a grid side impedance that is significantly higher than the inverter impedance.

One embodiment consistent with the present invention(s) includes an inverter controller comprising a current regulator unit, a voltage regulator unit regulating Vqd.filt coupled to and fed by the current regulator unit regulating I.load, an inverter unit coupled to and fed by the voltage regulator unit, and a filter and grid system controlled by the inverter unit.

In another embodiment, the voltage regulator unit is configured to receive feed back information from the filter and grid system.

In another embodiment, the voltage regulator unit has a PI regulator structure.

In another embodiment, the current regulator unit determines an error value by comparing a current setpoint value with a current feedback signal sent from the filter and grid unit and that generates a first voltage signal based on the comparison.

In another embodiment, the current regular unit transmits the first voltage signal to the voltage regulator unit.

In another embodiment, the voltage regulator unit is configured to compare the first voltage signal from the current regulator unit with a voltage signal from harmonic filter part of the filter and grid unit and to generate a second voltage signal based on the comparison of the first voltage signal and the power grid voltage signal, and the voltage regulator unit transmits the second voltage signal to the inverter unit.

In another embodiment, the voltage from the filter and grid unit is estimated using the following equation $V\hat{d}=Vdf+2*pi*freq*Lgrid*Iql-pIdl*Lgrid$, where $V\hat{d}$ is an estimated grid voltage, Vdf is a harmonic filter voltage in the synchronous reference frame, Iql and Idl are measured power grid currents transformed to the synchronous reference frame, Lgrid is a grid inductance and p is a derivative operator.

In another embodiment, the inverter unit controls the drive unit based on the second voltage signal.

In another embodiment, the drive unit is a motor.

In another embodiment, the inductance of a power grid connected to the drive unit is larger than the inductance of the inverter unit.

Another embodiment includes a method of controlling a drive unit comprising the steps of generating a first voltage signal by a current regulator unit, generating a second voltage signal based on the first voltage signal by a voltage regulator unit coupled to the current regulator unit, generating a control signal based on the second voltage signal by an inverter unit coupled to the voltage regulator unit and a filter and grid unit that is controlled by the inverter unit.

In another embodiment, the voltage regulator unit is configured to receive feed back information from the filter and grid unit coupled to the inverter unit.

In another embodiment, the voltage regulator unit has a PI regulator structure.

In another embodiment, the current regulator unit determines an error value by comparing a current setpoint value with a load signal sent from the drive unit and which generates a first voltage signal based on the comparison.

In another embodiment, the method includes the step of transmitting the first voltage signal from the current regulator unit to the voltage regulator unit.

In another embodiment, the voltage regulator unit is configured to compare the first voltage signal from the current regulator unit with a voltage signal from a power grid connected to the drive unit and to generate a second voltage signal based on the comparison of the first voltage signal and the power grid voltage signal, and
the voltage regulator unit transmits the second voltage signal to the inverter unit.

In another embodiment, the method includes the step of estimating the power grid voltage using the following equation $$V\hat{d}=Vdf+2*pi*\text{freq}*Lgrid*Iql-pIdl*Lgrid$$

where Vd^ is an estimated grid voltage, Vdf is a harmonic filter voltage, Iql and Idl are measured power grid currents, Lgrid is a grid inductance and p is a derivative operator.

In another embodiment, the inverter unit controls the drive unit based on the second voltage signal.

In another embodiment, the drive unit is a motor.

In another embodiment, the inductance of a power supply connected to the drive unit is larger than the inductance of the inverter unit.

Other systems, methods, features, and advantages of the present invention(s) will be or will become apparent to one with skill in the art upon examination of the following figures and detailed description. It is intended that all such additional systems, methods, features, and advantages be included within this description, be within the scope of the invention(s), and be protected by the accompanying claims.

BRIEF DESCRIPTION OF THE DRAWINGS

The accompanying drawings, which are incorporated in and constitute a part of this specification, illustrate an implementation of the present invention(s) and, together with the description, serve to explain the advantages and principles of the invention(s). In the drawings:

FIG. 3 depicts a current generated by an conventional inverter.

DETAILED DESCRIPTION OF THE PRESENTLY PREFERRED EMBODIMENTS

Figure 8:
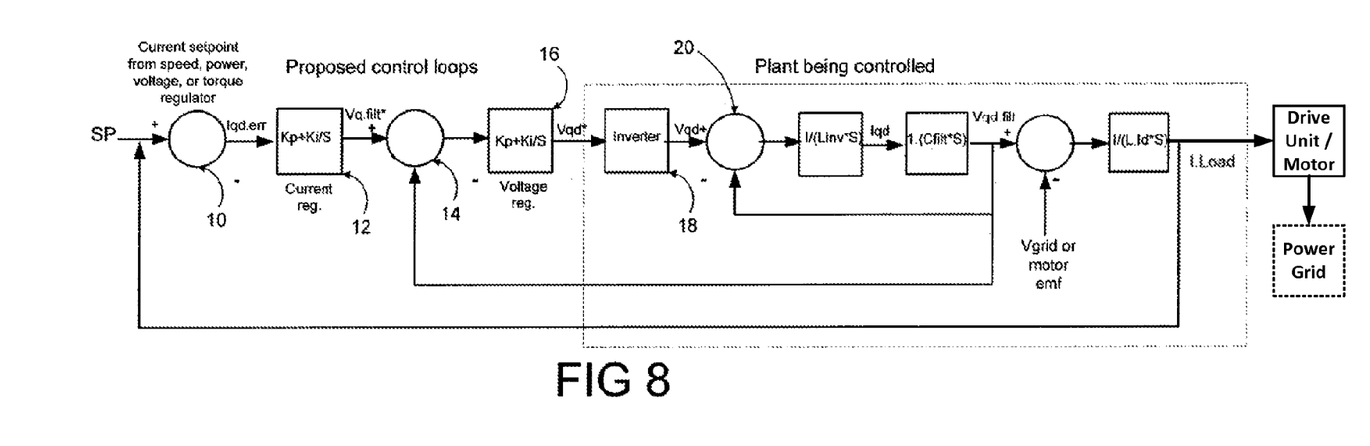
FIG. 8 depicts a schematic diagram representing a control loop configuration that is consistent with the present invention(s)

FIG. 8 depicts a schematic diagram representing a control loop configuration that is consistent with the present invention(s).

As illustrated in FIG. 8, a set point SP provided by any of a speed, power, voltage or torque regulator is compared against a system feedback value, preferably a current value of the load. In FIG. 8, the current set point SP is compared against feedback variable I.Load obtained from the plant being controlled in a comparator 10. Unless otherwise noted herein, the term "compare" can be interchanged with, and is understood to include the meaning of, "calculating a difference between." The comparison yields variable Iqd.err which is feed into a current regulator 12 to generate output voltage signal Vq.filt*. Voltage signal Vq.filt* is feed into another comparator 14 where it is compared against a feedback voltage signal Vq.filt from the grid connection.

The result of the comparison of signals Vq.filt* and Vq.filt is then fed into a voltage regulator 16. The voltage regulator 16 processes the signal Vq.filt* using a proportional value Kp and an integral value Ki/S to generate voltage signal Vqd*. The voltage signal Vqd* is then feed into the inverter 18 to control same.

This is accomplished by feeding the signal Vqd into a comparator 20 where the voltage Vqd+ is compared against voltage Vqd.filt (i.e., a difference is calculated). Signal Iqd is filtered, as mentioned above, to generate voltage Vqd.flt used to power a grid or motor. However, the grid or motor is also subject to its own load voltages or back emf which will negatively affect the power available. As illustrated, this negative impact is subtracted from the power Vqd.flt and filtered again by the load inductance to finally produced the load current I.Load.

As can also be seen, the signal Vqd.filt is fed back and compared against signal Vqd+ (i.e., a difference is calculated) so that signal Iqd itself provides some feedback as to the state of the output during the comparison with the current set point mentioned above.

As FIG. 8 depicts, an inner voltage regulator 16 is inserted between the current regulator and the inverter PWM modulator. This regulator may be a PI regulator structure identical to the current regulator, but it is generally not necessary to include an Integral term, since the regulator is in place, not primarily for accurate voltage regulation, but only to improve the system dynamics.

The voltage references for the Q and D axis voltages are provided by the current regulator 12, which can be used to regulate either grid current or inverter current. In one embodiment consistent with the present invention(s), grid current regulation provides improved performance.

Figure 9:
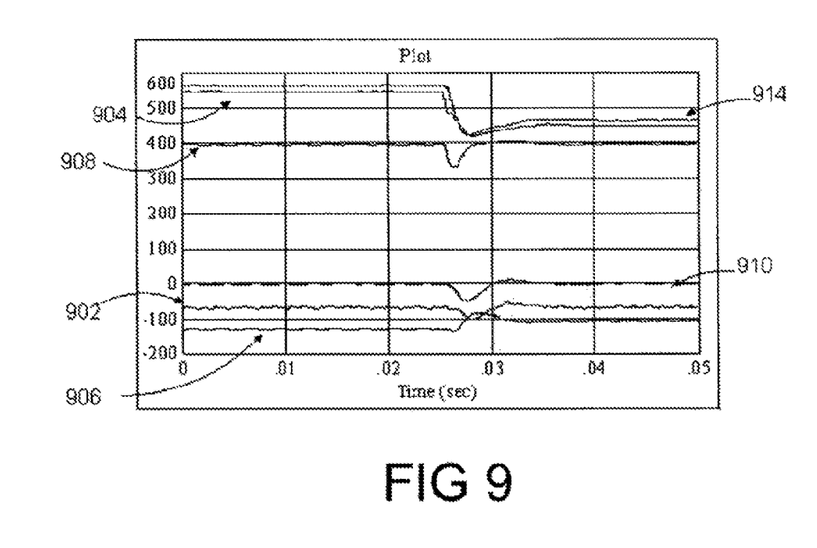
FIG. 9 depicts the step response generated with an inner voltage loop included in the control sequence that is consistent with the present invention(s) and when actual grid voltage is used for the PLL.

FIG. 9 depicts the step response generated with an inner voltage loop included in the control sequence that is consistent with the present invention(s). FIG. 9 is a simulated response using the VisSim™ application with the Grid voltage being fed directly to the PLL.

As FIG. 9 depicts, the inverter D axis current 902 is around 0, the inverter Q axis current 904 is between approximately 400 and 600 amps, the grid D axis voltage 906 is between approximately −150 and −25, the grid Q axis voltage 908 is approximately 400 volts, the axis D line current 910 is between approximately 0, and the axis Q line current 914 is between approximately 400-600 amps.

As FIG. 9 also depicts, a step change to the Q axis current 604 occurs at approximately 0.25 seconds, with the system remaining stable with a response time comparable to that obtained with an inner current loop only system.

As FIG. 9 demonstrates, significant disturbances to the harmonic filter voltage remain, but the disturbances are damped out with no evident long term limit cycle behavior. Further, with the inner voltage loop, it is possible to remove the passive damping elements of the harmonic filter without producing unstable operation. Consistent with this embodiment, the graph of FIG. 9 is achieved when the the PLL senses grid voltage directly. In another embodiment, the voltage at the harmonic filter is sensed.

Figure 10:
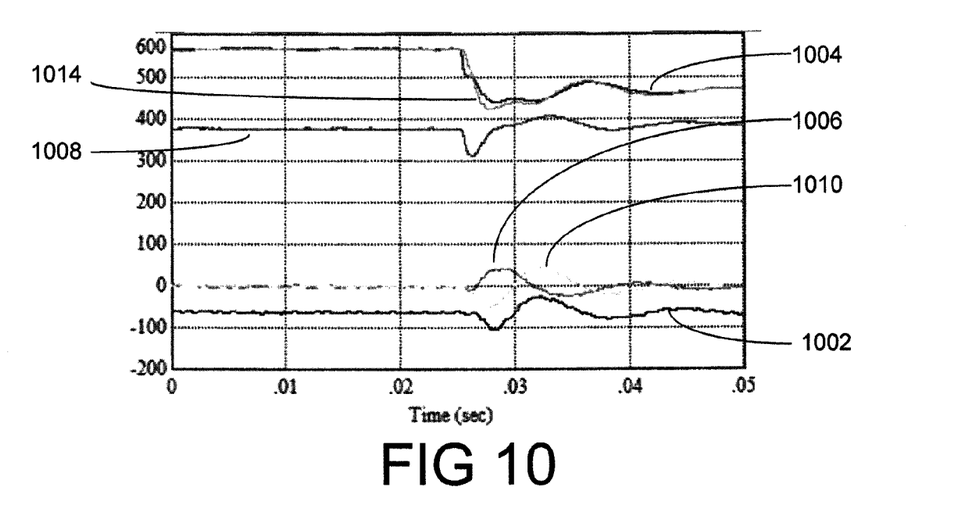
FIG. 10 depicts a graph showing the response degradation when only the source of signal for the PLL is the harmonic filter voltage without estimating grid voltage.

FIG. 10 depicts a graph showing the response degradation when only the source of signal for the PLL is the harmonic filter voltage. FIG. 10 is a simulated response using the VisSim™ application.

As FIG. 10 also depicts, the inverter D axis current 1002 is around 0, the inverter Q axis current 1004 is between approximately 400 and 600 amps, the grid D axis voltage 1006 is approximately 0, the grid Q axis voltage 1008 is approximately 400 volts, the axis D line current 1010 is between approximately 0, and the axis Q line current 1014 is between approximately 400-600 amps.

As FIG. 9 further depicts, a step change to the Q axis current 1004 occurs at approximately 0.25 seconds, with the system remaining stable with a response time comparable to that obtained with an inner current loop only system.

As FIG. 10 demonstrates, significant disturbances to the harmonic filter voltage remain, such as long term transients, but these disturbances are immediately damped out and with no evident long term limit cycle behavior is evident. Further, with the inner voltage loop, it is possible to remove the passive damping elements of the harmonic filter without producing unstable operation. Consistent with this embodiment, the graph of FIG. 10 is achieved with the PLL sensing harmonic filter voltage directly. In another embodiment, the voltage at the harmonic filter is sensed In one embodiment consistent with the present invention(s), the true grid voltage (or PM motor/generator back EMF) is estimated to alleviate the effects of a disturbance, such as a long term transient. The equation to estimate the true grid voltage is represented by the following equation (1)

$$Vd\hat{} = Vdf + 2*pi*\text{freq}*Lgrid*Iql - pIdl*Lgrid \qquad (1)$$

Where $Vd\hat{}$ is the estimated d axis grid voltage, Vdf is the measured d axis harmonic filter voltage, Iql and Idl are the measured grid currents, and Lgrid is the grid inductance and p is the derivative operator. In one embodiment, the estimated voltage is used in the PLL.

Figure 11:
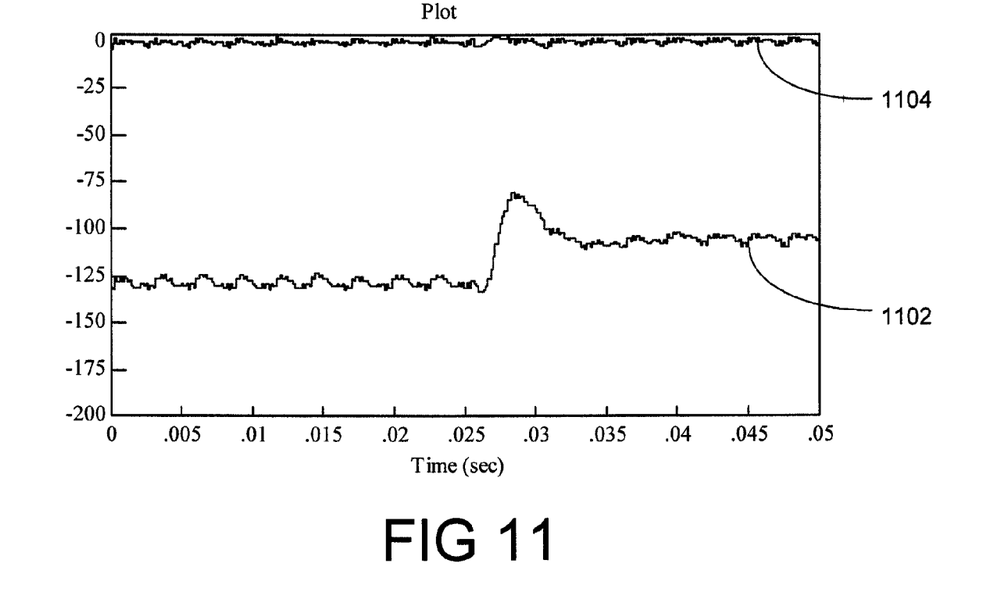
FIG. 11 depicts a graph showing the response improvement when the true grid voltage is estimated.

FIG. 11 depicts a graph showing the effect of using the estimated D axis grid voltage in the PLL. As the figure depicts, the transient in harmonic filter voltage is almost entirely eliminated by this estimator. Also eliminated is the steady state error introduced by a steady state Iq which causes and inductive voltage drop in the D axis current.

While various embodiments of the present invention(s) have been described, it will be apparent to those of skill in the art that many more embodiments and implementations are possible that are within the scope of this invention(s). Accordingly, the present invention(s) is not to be restricted except in light of the attached claims and their equivalents.

What is claimed:

1. An inverter controller comprising:
a current regulator unit generating a first voltage signal by applying a first proportional Kp term and a first integral Ki/S term to a current error signal;
a voltage regulator unit coupled to the current regulator unit, the voltage regulator unit generating a second voltage signal by applying at least a second proportional Kp term to a voltage error signal that is based on a comparison of the first voltage signal and a feedback voltage signal derived from an output voltage of an inverter unit;
the inverter unit coupled to the voltage regulator unit, the inverter unit being controlled by the second voltage signal from the voltage regulator unit; and
a drive unit controlled by the inverter unit.

2. The inverter controller of claim 1, wherein the voltage regulator unit is configured to receive feedback information from the drive unit.

3. The inverter controller of claim 1, wherein the voltage regulator unit has a PI regulator structure.

4. The inverter controller of claim 1, wherein the current regulator unit determines an error value by comparing a current setpoint value with a load signal sent from the drive unit and generates the first voltage signal based on the comparison.

5. The inverter controller of claim 4, wherein the current regulator unit transmits the first voltage signal to the voltage regulator unit.

6. The inverter controller of claim 5, wherein the voltage regulator unit is configured to compare the first voltage signal from the current regulator unit with a voltage signal from a power grid connected to the drive unit and to generate the second voltage signal based on the comparison of the first voltage signal and the power grid voltage signal, and the voltage regulator unit transmits the second voltage signal to the inverter unit.

7. The inverter controller of claim 6, wherein the voltage signal from the power grid is estimated using the following equation $$Vd\hat{} = Vdf + 2*pi*\text{freq}*Lgrid*Iql - pIdl*Lgrid$$

where $Vd\hat{}$ is an estimated grid voltage, Vdf is a harmonic filter voltage, Iql and Idl are measured power grid currents, Lgrid is a grid inductance and p is a derivative operator.

8. The inverter controller of claim 6 wherein the inverter unit controls the drive unit based on the second voltage signal.

9. The inverter controller of claim 1 wherein the drive unit is a motor.

10. The inverter controller of claim 1 wherein the inductance driven by the drive unit is larger than the inductance of the inverter unit.

11. A method of controlling a drive unit comprising the steps of:
generating, by a current regulator unit, a first voltage signal by applying a first proportional Kp term and a first integral Ki/S term to a current error signal;
generating, by a voltage regulator unit coupled to the current regulator unit, a second voltage signal based on the first voltage signal by applying at least a second proportional Kp term to a voltage error signal that is based on a comparison of the first voltage signal and a feedback voltage signal derived from an output voltage of an inverter unit;
generating a control signal based on the second voltage signal by the inverter unit coupled to the voltage regulator unit and a drive unit that is controlled by the inverter unit.

12. The method of claim 11 wherein the voltage regulator unit is configured to receive feedback information from the drive unit coupled to the inverter unit.

13. The method of claim 11 wherein the voltage regulator unit has a PI regulator structure.

14. The method of claim 11 wherein the current regulator unit determines an error value by comparing a current setpoint value with a load signal sent from the drive unit and which generates the first voltage signal based on the comparison.

15. The method of claim 14 including the step of transmitting the first voltage signal from the current regulator unit to the voltage regulator unit.

16. The method of claim 15 wherein
the voltage regulator unit is configured to compare the first voltage signal from the current regulator unit with a voltage signal from a power grid connected to the drive unit and to generate the second voltage signal based on the comparison of the first voltage signal and the power grid voltage signal, and the voltage regulator unit transmits the second voltage signal to the inverter unit.

17. The method of claim 16 including the step of estimating the power grid voltage using the following equation $$Vd\hat{} = Vdf + 2*pi*freq*Lgrid*Iql - pIdl*Lgrid$$

where $Vd\hat{}$ is an estimated grid voltage, Vdf is a harmonic filter voltage, Iql and Idl are measured power grid currents, Lgrid is a grid inductance and p is a derivative operator.

18. The method of claim 16 wherein the inverter unit controls the drive unit based on the second voltage signal.

19. The method of claim 11 wherein the drive unit is a motor.

20. The method of claim 11 wherein the inductance driven by the drive unit is larger than the inductance of the inverter unit.

* * * * *